United States Patent
Kim et al.

(10) Patent No.: US 10,115,432 B2
(45) Date of Patent: Oct. 30, 2018

(54) METHOD AND APPARATUS FOR CONSTRUCTING SENSORY EFFECT MEDIA DATA FILE, METHOD AND APPARATUS FOR PLAYING SENSORY EFFECT MEDIA DATA FILE, AND STRUCTURE OF THE SENSORY EFFECT MEDIA DATA FILE

(71) Applicant: MYONGJI UNIVERSITY INDUSTRY AND ACADEMIA COOPERATION FOUNDATION, Gyeonggi-do (KR)

(72) Inventors: Sang Kyun Kim, Gyeonggi-do (KR); Jung Yup Oh, Gyeonggi-do (KR); Min Woo Kim, Seoul (KR); Yong Soo Joo, Seoul (KR)

(73) Assignee: Myongji University Industry and Academia Cooperation Foundation, Gyeonggi-Do (KR)

( * ) Notice: Subject to any disclaimer, the term of this patent is extended or adjusted under 35 U.S.C. 154(b) by 0 days.

(21) Appl. No.: 14/382,292

(22) PCT Filed: Jan. 3, 2014

(86) PCT No.: PCT/KR2014/000045
§ 371 (c)(1),
(2) Date: Aug. 29, 2014

(87) PCT Pub. No.: WO2015/056842
PCT Pub. Date: Apr. 23, 2015

(65) Prior Publication Data
US 2016/0293213 A1    Oct. 6, 2016

(30) Foreign Application Priority Data

Oct. 18, 2013 (KR) .................. 10-2013-0124987
Dec. 11, 2013 (KR) .................. 10-2013-0154236

(51) Int. Cl.
*H04N 21/236* (2011.01)
*H04N 21/43* (2011.01)
(Continued)

(52) U.S. Cl.
CPC ............ *G11B 27/036* (2013.01); *G11B 27/34* (2013.01); *H04N 21/23614* (2013.01);
(Continued)

(58) Field of Classification Search
CPC ........................ G11B 27/036; G11B 27/34; H04N 21/23614; H04N 21/4307; H04N 21/4348;
(Continued)

(56) References Cited

U.S. PATENT DOCUMENTS

2006/0146185 A1* 7/2006 Chen ................. H04N 21/2368
348/410.1
2009/0199100 A1 8/2009 Hwang et al.
(Continued)

FOREIGN PATENT DOCUMENTS

KR 10-2008-0112149 A 12/2008
KR 10-2009-0038834 A 4/2009
(Continued)

OTHER PUBLICATIONS

International Search Report of PCT/KR2014/000045 dated Jun. 27, 2014.

*Primary Examiner* — Thai Tran
*Assistant Examiner* — Christopher T Braniff
(74) *Attorney, Agent, or Firm* — Innovation Law LLP

(57) ABSTRACT

Disclosed is a method and apparatus for constructing and playing a sensory effect media data file, which includes information on sensory effects. A method for constructing a sensory effect media data file according to an embodiment of the present invention includes: inserting first composition information, which represents a property of media data, into
(Continued)

a composition information container field; inserting second composition information, which represents a property of sensory effect data, into the composition information container field; inserting a sample of the media data into a media data field, where the sample represents data associated with a timestamp; and inserting a sample of the sensory effect data into the media data field.

11 Claims, 9 Drawing Sheets

(51) Int. Cl.
  *H04N 21/434* (2011.01)
  *H04N 21/81* (2011.01)
  *H04N 21/84* (2011.01)
  *H04N 21/854* (2011.01)
  *G11B 27/036* (2006.01)
  *G11B 27/34* (2006.01)
(52) U.S. Cl.
  CPC ..... *H04N 21/4307* (2013.01); *H04N 21/4348* (2013.01); *H04N 21/816* (2013.01); *H04N 21/8133* (2013.01); *H04N 21/84* (2013.01); *H04N 21/85406* (2013.01)
(58) Field of Classification Search
  CPC .. H04N 21/8133; H04N 21/816; H04N 21/84; H04N 21/85406
  See application file for complete search history.

(56) References Cited

U.S. PATENT DOCUMENTS

2010/0268745 A1*  10/2010  Choi .................... G11B 27/105
                                                               707/802
2012/0239712 A1*  9/2012  Lee .................... G11B 27/3027
                                                               707/821

FOREIGN PATENT DOCUMENTS

KR    10-2010-0114858 A    10/2010
KR    10-2012-0106157 A    9/2012

* cited by examiner

```
<SEM attributes . . >
    <DescriptionMetadata>
    </ DescriptionMetadata>

<Declarations>
    </ Declarations>
                                            untimed data
- - - - - - - - - - - - - - - - - - - - - - - - - - - - -
                                            timed data
    <Effect............/>
    <Effect............/>
    <GroupOfEffects>
                <Effect............/>
                <Effect............/>
    </ GroupOfEffects>
    <ReferenceEffect............/>
</SEM>
```

FIG. 4

METHOD AND APPARATUS FOR CONSTRUCTING SENSORY EFFECT MEDIA DATA FILE, METHOD AND APPARATUS FOR PLAYING SENSORY EFFECT MEDIA DATA FILE, AND STRUCTURE OF THE SENSORY EFFECT MEDIA DATA FILE

CROSS-REFERENCE TO RELATED APPLICATIONS

This application is a National Phase Application of PCT International Application No. PCT/KR2014/000045, which was filed on Jan. 3, 2014, and which claims priority from Korean Patent Application No. 10-2013-0124897, filed with the Korean Intellectual Property Office on Oct. 18, 2013, and Korean Patent Application No. 10-2013-0154236, filed with the Korean Intellectual Property Office on Dec. 11, 2013. The disclosures of the above patent applications are incorporated herein by reference in their entirety.

BACKGROUND

1. Technical Field

The present invention relates to a method and apparatus for constructing and playing media data, more particularly to a method and apparatus for constructing and playing a sensory effect media data file that includes sensory effect information.

2. Description of the Related Art

The typical format of a media file may basically include a header portion, which describes the information of the corresponding media content, and a video data portion, which stores the media data in a compressed form. While the typical format of a media file described above can be used to store simple video data, it may not be suitable as a comprehensive structure for holding various types of media.

Accordingly, the international standards organization MPEG defined the ISO base media file format as a basic file format that can be commonly applied to various applications. The ISO base media file format is designed to store data, such as a compressed media stream, composition information related to the media stream, and the like, in multiple containers in a hierarchical manner. The ISO base media file format does not define encryption and decryption methods but rather defines a basic structure for efficiently storing encrypted or decrypted media streams.

As can be seen from HD broadcasting and 3D broadcasting, not to mention IMAX and 4D movies, there is a growing interest in methods for providing more realistic videos, in industries related to video contents. In order to allow the user to become immersed in a video content and feel as if he/she is one of the characters in the story, it is necessary not only to provide visual and auditory engrossment but also to maximize engrossment via stimulations of other senses such as the olfactory and tactile senses. To do so, it is necessary not only to provide higher levels of visual engrossment, such as by the ultrahigh resolutions and 3D displays, and higher levels of auditory realism, such as by 3D audio displays, as for existing video contents, but also to apply adjustments to sensory effect metadata (SEM), such as lighting, wind, temperature, vibrations, movement, tactile feels, scents, etc., in a manner suitable to the user's viewing environment and thereby maximize the engrossment with the video content. Broadcasts or video contents that stimulate the user's five senses by thus utilizing sensory effect devices in the user's surroundings are referred to as sensory contents or 4D media.

Existing 4D media using SEM is difficult to create, since the audiovisual content data and the SEM are separated, and it is thus difficult to effectively store, exchange, manage, and play the media. Prior art related to this subject includes Korean Patent Publication No. 10-2012-0106157.

Thus, there is a need for more research regarding methods for effectively storing, exchanging, managing, and playing 4D media.

SUMMARY

An objective of the invention is to provide a method and apparatus for constructing a file by integrating sensory effect data with media data and provide a method and apparatus for playing the sensory effect media data file formed by the sensory effect data and the media data integrated together.

An objective of the invention is to provide a method and apparatus for constructing a sensory effect media data file by dividing the sensory effect data into samples and inserting a divided sample of the sensory effect data and a sample of the media data into the same field, and to provide a method and apparatus for playing such sensory effect media data file.

To achieve the objectives above, an embodiment of the invention provides a method for constructing a sensory effect media data file that includes: inserting first composition information, which represents a property of media data, into a composition information container field; inserting second composition information, which represents a property of sensory effect data, into the composition information container field; inserting a sample of the media data into a media data field, where the sample represents data associated with a timestamp; and inserting a sample of the sensory effect data into the media data field.

To achieve the objectives above, an embodiment of the invention provides an apparatus for constructing a sensory effect media data file that includes: a composition information constructor unit configured to insert first composition information and second composition information into a composition information container field, where the first composition information represents a property of media data, and the second composition information represents a property of sensory effect data; a sample constructor unit configured to insert a sample of the media data into a media data field and insert a sample of the sensory effect data into the media data field, where the sample represents data associated with a timestamp; and a file constructor unit configured to construct a sensory effect media data file by combining the first composition information, the second composition information, the sample of the media data, and the sample of the sensory effect data.

To achieve the objectives above, an embodiment of the invention provides a method for playing a sensory effect media data file that includes: separating a composition information container field and a media data field included in a sensory effect media data file; detecting first composition information and second composition information by parsing the separated composition information container field, where the first composition information represents a property of media data, and the second composition information represents a property of sensory effect data; detecting a sample of the media data and a sample of the sensory effect data by parsing the separated media data field, where the sample represents data associated with a timestamp; and playing the sensory effect media data by using the first composition information, the second composition information, the sample of the media data, and the sample of the sensory effect data.

To achieve the objectives above, an embodiment of the invention provides an apparatus for playing a sensory effect media data file that includes: a file separator unit configured to separate a composition information container field and a media data field included in a sensory effect media data file; a composition information parser unit configured to parse the separated composition information container field to detect first composition information and second composition information, where the first composition information represents a property of media data, and the second composition information represents a property of sensory effect data; a sample parser unit configured to parse the separated media data field to detect a sample of the media data and a sample of the sensory effect data, where the sample represents data associated with a timestamp; and a player unit configured to play the sensory effect media data by using the first composition information, the second composition information, the sample of the media data, and the sample of the sensory effect data.

To achieve the objectives above, an embodiment of the invention provides a sensory effect media data file structure that includes: a composition information container field in which first composition information and second composition information are inserted, where the first composition information represents a property of media data, and the second composition information represents a property of sensory effect data; and a media data field in which a sample of the media data and a sample of the sensory effect data are inserted, where the sample represents data associated with a timestamp.

To achieve the objectives above, an embodiment of the invention provides a sensory effect media data file structure that includes: a composition information container field in which composition information is inserted, where the composition information represents a property of media data; a media data field in which a sample of the media data is inserted, where the sample represents data associated with a timestamp; and a meta field in which sensory effect metadata is inserted.

According to an embodiment of the invention, the sensory effect data and media data can be integrated to form and be processed as a single file, thereby making it possible to effectively store, manage, and play the sensory effect media data.

According to an embodiment of the invention, the sensory effect data can be divided into samples, and the divided sample of the sensory effect data and a sample of the media data can be inserted into the same field to construct a sensory effect media data file, to allow useful application to streaming services or broadcasting services.

Additional aspects and advantages of the present invention will be set forth in part in the description which follows, and in part will be obvious from the description, or may be learned by practice of the invention.

BRIEF DESCRIPTION OF THE DRAWINGS

FIG. 4 is a diagram for describing a method of dividing sensory effect data into timed data and untimed data related to an embodiment of the invention.

DETAILED DESCRIPTION

A method and apparatus for constructing a sensory effect media data file, a method and apparatus for playing a sensory effect media data file, and a structure for the sensory effect media data file will be described below in more detail with reference to the accompanying drawings.

In the present specification, an expression used in the singular encompasses the expression of the plural, unless it has a clearly different meaning in the context. In the present specification, terms such as "comprising" or "including," etc., should not be interpreted as meaning that all of the elements or operations are necessarily included. That is, some of the elements or operations may not be included, while other additional elements or operations may be further included.

Figure 1:
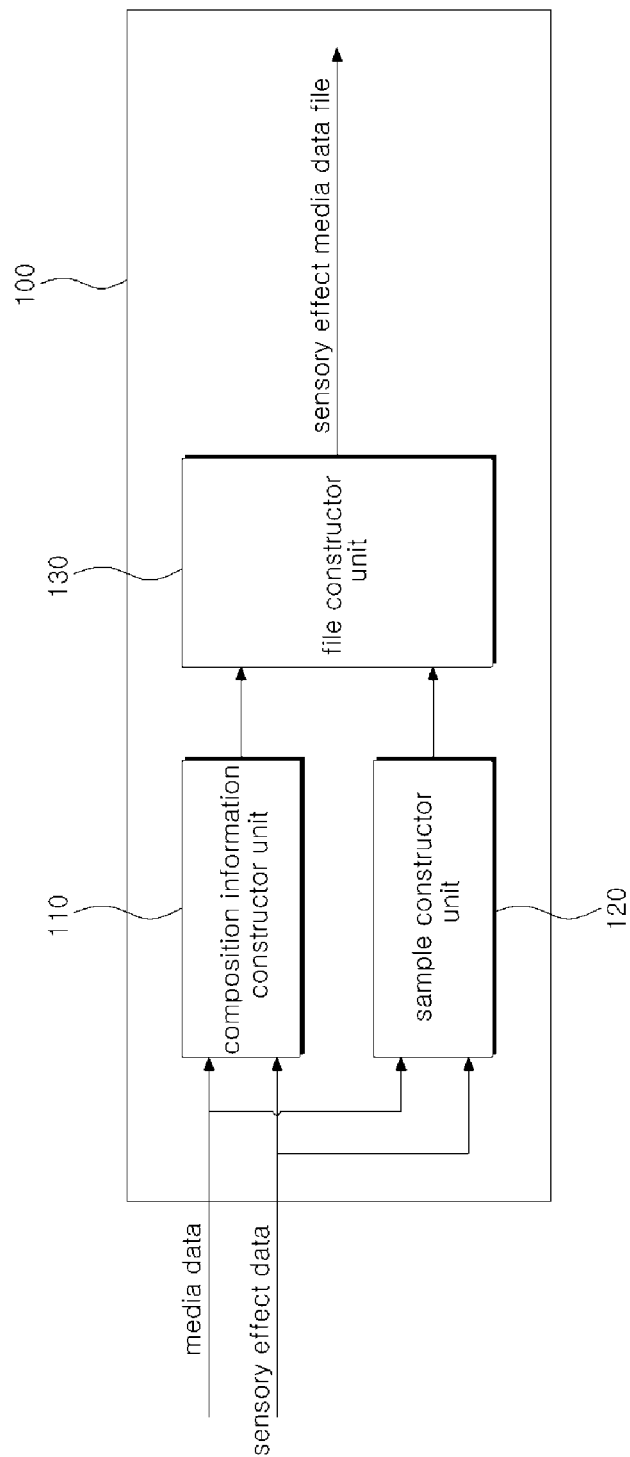
FIG. 1 is a block diagram of an apparatus for constructing a sensory effect media data file related to an embodiment of the invention.

FIG. 1 is a block diagram of an apparatus for constructing a sensory effect media data file related to an embodiment of the invention.

As illustrated in FIG. 1, a sensory effect media data file construction apparatus 100 can include a composition information constructor unit 110, a sample constructor unit 120, and a file constructor unit 130.

In the present specification, media data can include video data, voice data, text data, etc., and can be a combination of at least one or two or more of video data, voice data, and text data. Also, the video data can include three-dimensional video data such as stereoscopic images.

In the present specification, sensory effect data (sensory effect metadata, SEM) may be data that represents sensory effect information, while the sensory effect information may be information that can provide the user of the media data with a stimulation of the visual, auditory, tactile sensation, etc., and may be information that can express light, flashes, heating, cooling, wind, vibration, scents, fog, spraying, color correction, tactile sensation, kinesthetic sensation, rigid body motion, etc. The sensory effect data can take the form of an xml instance.

The sensory effect data can be constructed as DescriptionMetadata, Declarations, GroupOfEffects, Effect, or ReferenceEffect.

DescriptionMetadata, based on Type, may be used when describing authorship information such as the last update time, comments, creators, location of creation, etc., of a sensory effect, while Declarations, GroupOfEffects, Effect, and ReferenceEffect may be used when expressing the sensory effect. Declarations may be used to pre-define sensory effects that are frequently used. ReferenceEffect may be used when referencing sensory effects that were defined in an external resource or sensory effects that were defined in Declarations, or when reusing sensory effects that have been used already. Effect may be used when expressing one sensory effect, while GroupOfEffects may be used when expressing two or more sensory effects.

Also, a sensory effect media data file refers to a file constructed with the media data and the sensory effect data integrated together.

The media data can be inputted to the composition information constructor unit 110 and the sample constructor unit 120. The media data can be inputted from the outside.

The sensory effect data can be inputted to the composition information constructor unit 110 and the sample constructor unit 120. The sensory effect data can be inputted from the outside.

The composition information constructor unit 110 can detect the information on a media object forming the media data and can construct the composition information for each media object (referred to herein as 'first composition information' for convenience). The first composition information can represent a property of the media data. For example, the composition information constructor unit 110 can construct the composition information to include information on the size of the video data included in the media data, information for defining the type of the encryption stream of the media data, information related to the camera used for obtaining the video, display information required for displaying the video, information on the frame rate of the video date, the number of field lines for frames forming the video data, etc. Furthermore, in cases where the media data includes a three-dimensional video, the composition information constructor unit 110 can further include disparity information between the left video and right video included for the three-dimensional video. Also, the composition information can include address information for samples of the media data.

In the present specification, a sample can mean any data associated with a timestamp.

Also, the composition information constructor unit 110 can construct composition information representing a property of sensory effect data (referred to herein as 'second composition information' for convenience). For example, the second composition information can include description information on a sensory effect data sample and address information for the sensory effect data sample.

The composition information constructor unit 110 can insert the first composition information and the second composition information into the same field (for instance, the composition information container field).

Also, the sample constructor unit 120 can construct the sample of the media data and the sample of the sensory effect data and can insert them into the media data field. The media data sample can be encrypted data. Also, the sample of the sensory effect data can be timed data from among the sensory effect data.

According to an embodiment of the present invention, the sensory effect data can be divided into timed data and untimed data. Timed data refers to data that is affected by time, while untimed data refers to data that is not affected by time.

According to another embodiment of the present invention, the sensory effect media data file can be constructed without forming the sensory effect data as samples but by inserting the xml instance form as is into the meta box.

In the embodiments below, the sensory effect media data file may be based on the ISO base media file format to allow combinations of various component standards. File formats based on the ISO base media file format include the MPEG-4 file format (ISO/IEC 14496-14), MPEG-21 file format (ISO/IEC 21000-9), etc. Such a file format is resilient, has very good expandability, and is advantageous for streaming services.

The ISO base media file format is basically composed of sets called boxes. The type of a box is indicated by a unique identifier made as an abbreviation of four letters. For example, the box type of the media data box is 'mdat'.

Figure 2:
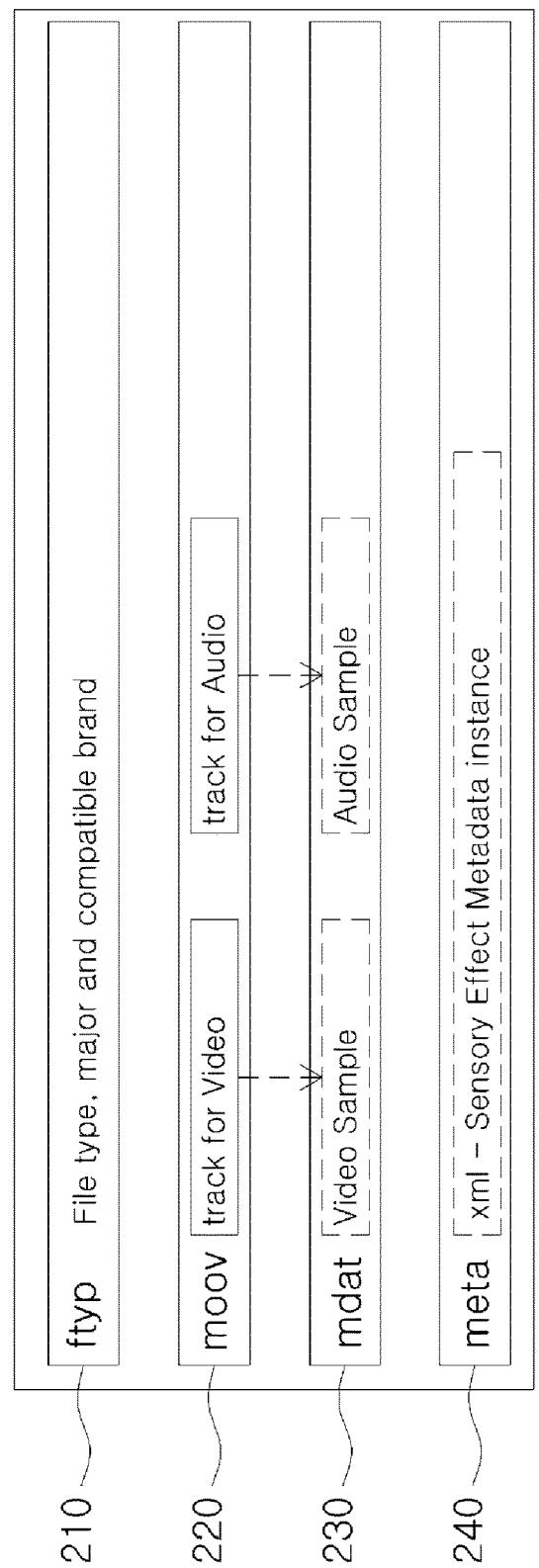
FIG. 2 and FIG. 3 are diagrams illustrating the structure of a sensory effect media data file related to an embodiment of the invention.

FIG. 2 shows the structure of a sensory effect media data file constructed by using a meta box.

The illustrated sensory effect media data file can include the ftyp box 210, moov box 220, mdat box 230, and meta box 240. In the ftyp box 210, information on the file type and information on compatibility can be inserted. The moov box 220 may be the composition information container field, and can have the composition information of the media data inserted therein. For example, the moov box 220 can include track boxes for the media data (track for video, track for audio), and the address information of the media data sample can be stored in the track boxes for the media data. The mdat box 230 may be the media data field, and can have the samples of the media data (Video Sample, Audio Sample) inserted therein. Also, the meta box 240 may be the container box of the xml box.

The meta box 240 can include an xml box that carries the xml. The embodiment shown in FIG. 2 is possible when considering only simple storage. The embodiment above entails the advantage of easy implementation.

As another embodiment of the present invention, the sensory effect media data file can be constructed using track boxes.

Figure 3:
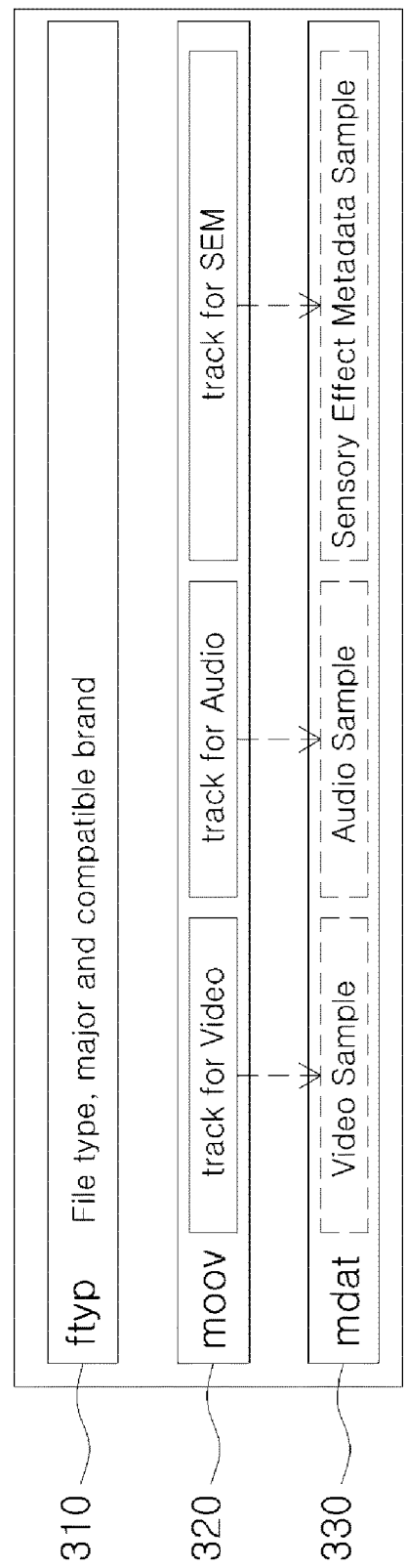

FIG. 3 shows the structure of a sensory effect media data file constructed by using track boxes.

The illustrated sensory effect media data file can include the ftyp box 310, moov box 320, and the mdat box 330. The ftyp box 310 can have the information on the file type and information on compatibility inserted therein. The moov box 320 may be the composition information container field, and can have the composition information of the media data inserted therein. For example, the moov box 320 can include track boxes for the media data (track for video, track for audio), and a track box for the sensory effect data (track for SEM). The address information of the media data sample can be stored in the track boxes for the media data, and description information and address information of the sensory effect data sample can be included in the track box for the sensory effect data. The mdat box 330 may be the media data field, and can have the samples of the media data (Video Sample, Audio Sample) and samples of the sensory effect data (Sensory Effect Metadata Sample) inserted therein.

That is, instead of carrying the sample directly, the track may take the structure of referencing the sample held in the mdat box. A major issue in the scheme of referencing a SEM sample held in the mdat box by way of a SEM track is to divide the SEM xml instance according to certain criteria and storing in the mdat, in order to create samples from the SEM. With this embodiment, the sensory effect data (SEM) may be stored in a divided form, and hence can be suitable for a streaming service or a broadcast service environment that employs MPEG-2 TS using hint tracks. According to this embodiment, when a TV is turned on for viewing sensory effect media data, the SEM samples corresponding to the current presentation time may be downloaded, instead of receiving the entire SEM. Thus, the user does not have to wait for the downloading of the entire SEM. Also, in terms of the performance of a sensory device, it may be sufficient to decode only the information regarding the effects corresponding to the current presentation time, so that there is less dependence on performance.

In order to construct such a sensory effect media data file that uses SEM tracks, the SEM may be divided into timed data (i.e. metadata that is affected by time; timed metadata) and untimed data (metadata that is not affected by time; untimed metadata).

FIG. 4 is a diagram for describing a method of dividing sensory effect data into timed data and untimed data related to an embodiment of the invention.

FIG. 4 uses an XML instance of SEM as an example to show the results of dividing into timed data and untimed data. From among the SEM, the timed data is GroupOfEffects, Effect, and ReferenceEffet and correspond to samples of mdat, while the untimed data is DescriptionMetadata and Declarations and is included in the stsd and sgpd boxes.

The timed data from among the sensory effect data (SEM) is entered into the mdat box. From among the timed data, Effect and ReferenceEffect each form a sample. These samples may be stored in the mdat box, and the locations of the samples in mdat can be found from the chunk_offset values of the stco box.

Figure 5:
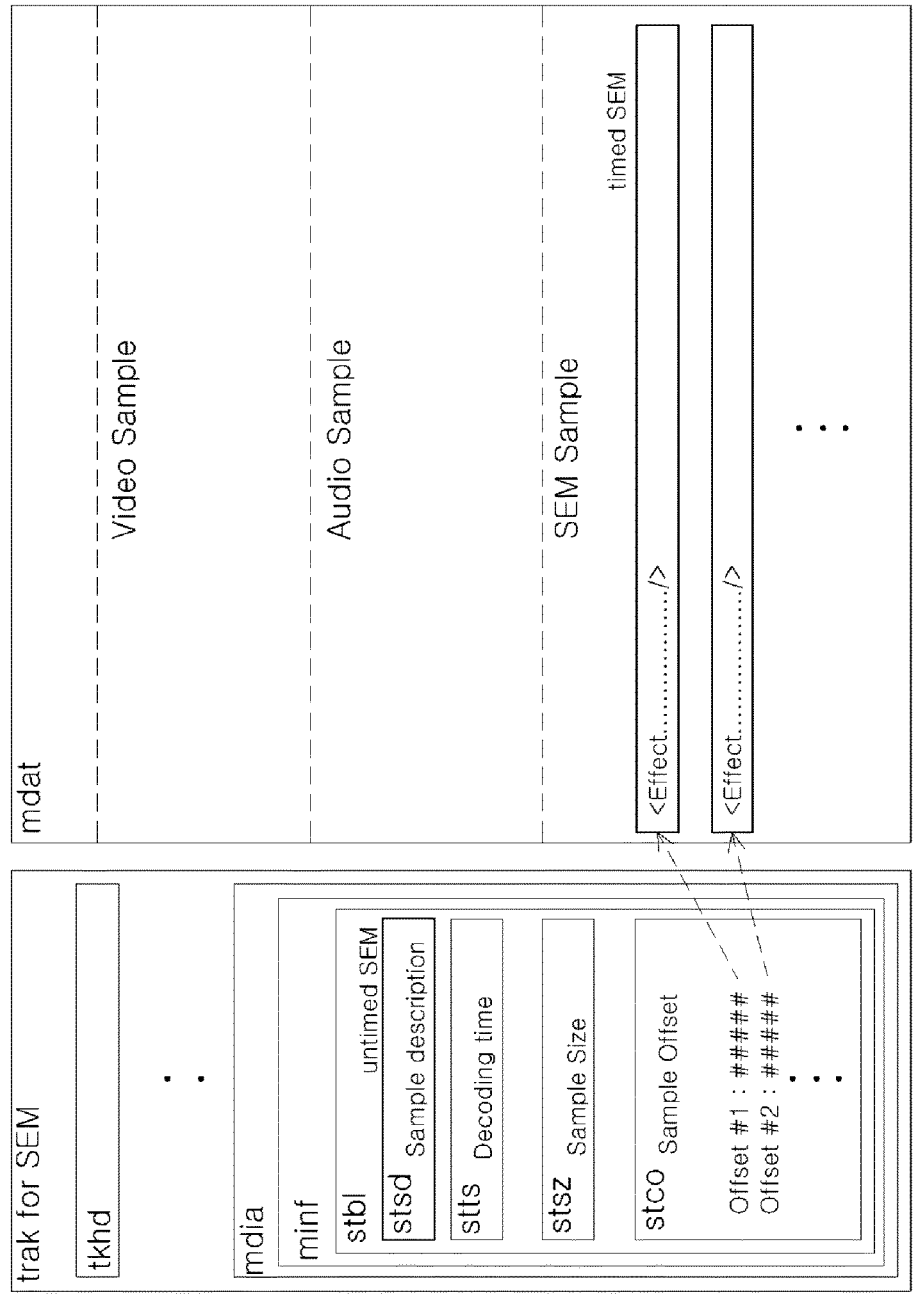
FIG. 5 illustrates a method of constructing timed data from among sensory effect data related to an embodiment of the invention.

FIG. 5 illustrates a method of constructing timed data from among sensory effect data related to an embodiment of the invention.

FIG. 5 shows how the chunk_offset of the stco box (the box in which offset information is inserted) points to SEM samples within mdat. The single effect and single reference effect can find the offsets of the SEM samples within mdat through the stco box. On the other hand, Group Of Effects may subdivide the effects and reference effects therein such that each forms a SEM sample. However, after such subdivision in the manner described above, it may not be known which SEM sample belonged to which Group Of Effects. If the original SEM XML instance can be recovered at the sensory effect media data file, it is possible to edit the recovered SEM XML instance by using an existing SEM authoring tool and recreate the sensory effect media data file.

Figure 6:
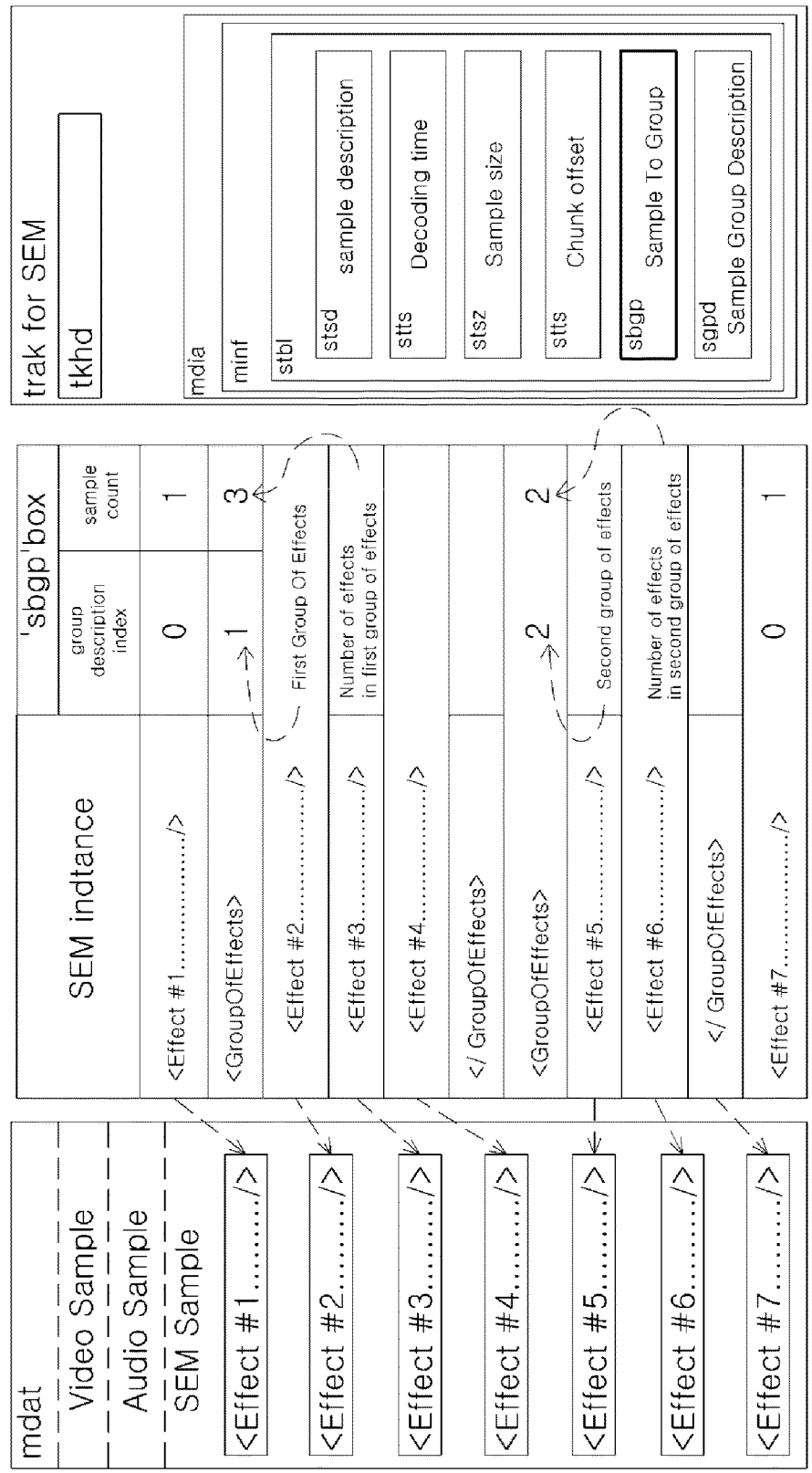
FIG. 6 illustrates a method of constructing group effect data for expressing multiple sensory effects related to an embodiment of the invention.

FIG. 6 illustrates a method of constructing group effect data for expressing multiple sensory effects related to an embodiment of the invention. That is, a method of constructing a file box according to GroupOfEffects is illustrated.

As illustrated in the drawings, the sbgp box may be the group sample field, and SEM samples can be grouped by way of the group description index and sample count information (sample_count) of the sbgp box. Regarding the contents of the sbgp box, a group description index value of 0 may represent a single effect or a single reference effect (an effect that is not included in Group Of Effects), while a group description index of 1 or higher may represent effects or reference effects within a Group Of Effects. As the number of the Group Of Effects is increased, so also does the group description index value increase.

Also, the sample count may represent the number of consecutive samples that have the same group description index value. In FIG. 6, the first effect is a single effect. Thus, the group description index is 0, and since the consecutive number of single effects is one, the sample count is 1. The second, third, and fourth effects are effects that belong to GroupOfEffect. Since this is the first GroupOfEffects, the group description index is 1, and since the number of consecutive effects of this GroupOfEffects is three, the sample count is 3. After subdividing the GroupOfEffects by this method to provide single effect samples, these can be grouped together. Also, it is also possible to recover the GroupOfEffects from the subdivided single effect samples.

The untimed data from among the sensory effect data can be inserted into the stsd box (the box in which sample description information is inserted) and the sgpd box (the box in which sample group description information is inserted) of the SEM track, which is a different field from the media data field.

Figure 7:
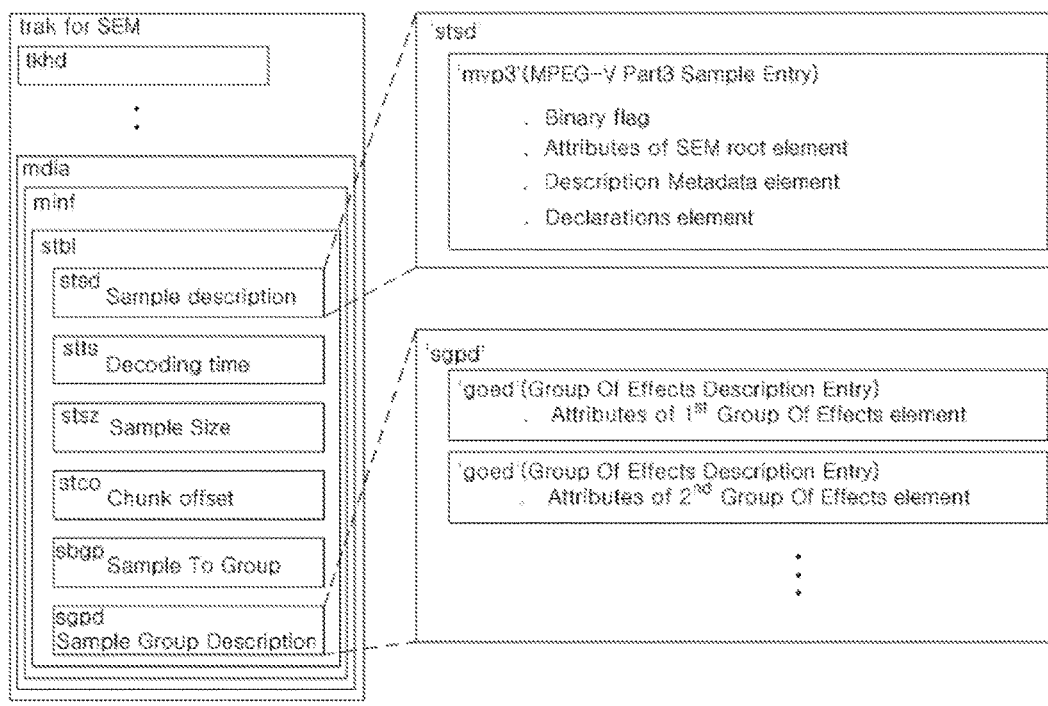
FIG. 7 illustrates a method of constructing untimed data from among sensory effect data related to an embodiment of the invention.

FIG. 7 illustrates a method of constructing untimed data from among sensory effect data related to an embodiment of the invention.

FIG. 7 shows how untimed data may be held in the stsd box and sgpd box. The boxes can be newly defined in table form as Table 1 and Table 2.

TABLE 1

```
// MPEG-V Part3 Sample Entry
aligned(8) class MPEGVPart3SampleEntry
extends MetaDataSampleEntry('mvp3') {
/* xml or binary flag */
unsigned int(8) binaryFlag;   // 0: binary, 1: xml
/* any attribute */
unsigned int(8) isAnchorElement;
if(isAnchorElement == 1) {
unsigned int(8) anchorElement;
}
unsigned int(8) isEncodeAsRAP;
if(isEncodeAsRAP == 1) {
unsigned int(8) encodeAsRAP;
}
    unsigned int(8) isPuMode;
if(isPuMode == 1) {
string puMode;
}
    unsigned int(8) isTimeScale;
if(isTimeScale == 1) {
unsigned int(32) timeScale;
}
    unsigned int(8) isPtsDelta;
if(isPtsDelta == 1) {
unsigned int(32) ptsDelta;
}
    unsigned int(8) isAbsTimeScheme;
if(isAbsTimeScheme == 1) {
string absTimeScheme;
}
    unsigned int(8) isAbsTime;
if(isAbsTime == 1) {
string absTime;
}
    unsigned int(8) isPts;
if(isPts == 1) {
unsigned int(32) pts;
}
    unsigned int(8) isAutoExtractionType;
if(isAutoExtractionType == 1) {
string autoExtractionType;
}
/* DescriptionMetadata, Declaration element */
unsigned int(8) isDescriptionMetaData;
if(isDescriptionMetaData == 1) {
unsigned int(32) descriptionmetadata_length;
unsigned int(8) descriptionmetadata[ ];
}
unsigned int(8) isDeclaration;
if(isDeclaration == 1) {
unsigned int(32) declaration_count;
unsigned int(32) declaration_length[ ];
unsigned int(8) declaration[ ][ ];
}
}
```

The MPEGVPart3SampleEntry('mvp3') of Table 1 is a newly defined box and inherited MetaDataSampleEntry defined in the ISO Base Media File Format. This is located inside the stsd box. The contents held in MPEGVPart3SampleEntry include a Binary flag, attributes of SEM root elements, Description Metadata elements, and Declarations elements. The Binary flag may determine whether the timed SEM data and untimed SEM data are to be stored in string form or binary form. The rules when storing in binary form may follow the binary representation syntax described in MPEG-V Part3 (ISO/IEC 23005-3). The attributes of SEM root elements may include information such as time scale, pts, pts delta, etc. The Description Metadata elements may be used to hold authorship information, and the Declarations element may be used to pre-define effects that are frequently used.

TABLE 2

```
// Group Of Effects Description Entry
aligned(8) class GroupOfEffectsDescriptionEntry
extends SampleGroupDescriptionEntry('goed') {
/* any attribute */
unsigned int(8) isAnchorElement;
if(isAnchorElement == 1) {
unsigned int(8) anchorElement;
}
unsigned int(8) isEncodeAsRAP;
if(isEncodeAsRAP == 1) {
unsigned int(8) encodeAsRAP;
}
unsigned int(8) isPuMode;
if(isPuMode == 1) {
string puMode;
}
unsigned int(8) isTimeScale;
if(isTimeScale == 1) {
unsigned int(32) timeScale;
}
unsigned int(8) isPtsDelta;
if(isPtsDelta == 1) {
unsigned int(32) ptsDelta;
}
unsigned int(8) isAbsTimeScheme;
if(isAbsTimeScheme == 1) {
string absTimeScheme;
}
unsigned int(8) isAbsTime;
if(isAbsTime == 1) {
string absTime;
}
unsigned int(8) isPts;
if(isPts == 1) {
unsigned int(32) pts;
}
unsigned int(8) isAutoExtractionType;
if(isAutoExtractionType == 1) {
string autoExtractionType;
}
/* sem base attributes */
unsigned int(8) isActivate;
if(isActivate == 1) {
unsigned int(8) activate;
}
unsigned int(8) isDuration;
if(isDuration == 1) {
unsigned int(32) duration;
}
unsigned int(8) isFade;
if(isFade == 1) {
unsigned int(32) fade;
}
unsigned int(8) isAlt;
if(isAlt == 1) {
string alt;
}
unsigned int(8) isPriority;
if(isPriority == 1) {
unsigned int(32) priority;
}
unsigned int(8) isLocation;
if(isLocation == 1) {
string location;
}
```

TABLE 2-continued

```
/* sem adaptability attribute */
unsigned int(8) isAdaptType;
if(isAdaptType == 1) {
string adaptType;
}
unsigned int(8) isAdaptRange;
if(isAdaptRange == 1) {
string adaptRange;
}
}
```

The GroupOfEffectsDescriptionEntry of Table 2 is a newly defined box and inherited SampleGroupDescriptionEntry defined in the ISO Base Media File Format. This is located inside the sgpd box. The attributes of GroupOfEffects may be held in GroupOfEffectsDescriptionEntry.

Other advantages of constructing sensory effect media data with the SEM tracks described above are the efficient storing and transmitting of MPEG-2 TS packets.

Figure 8:
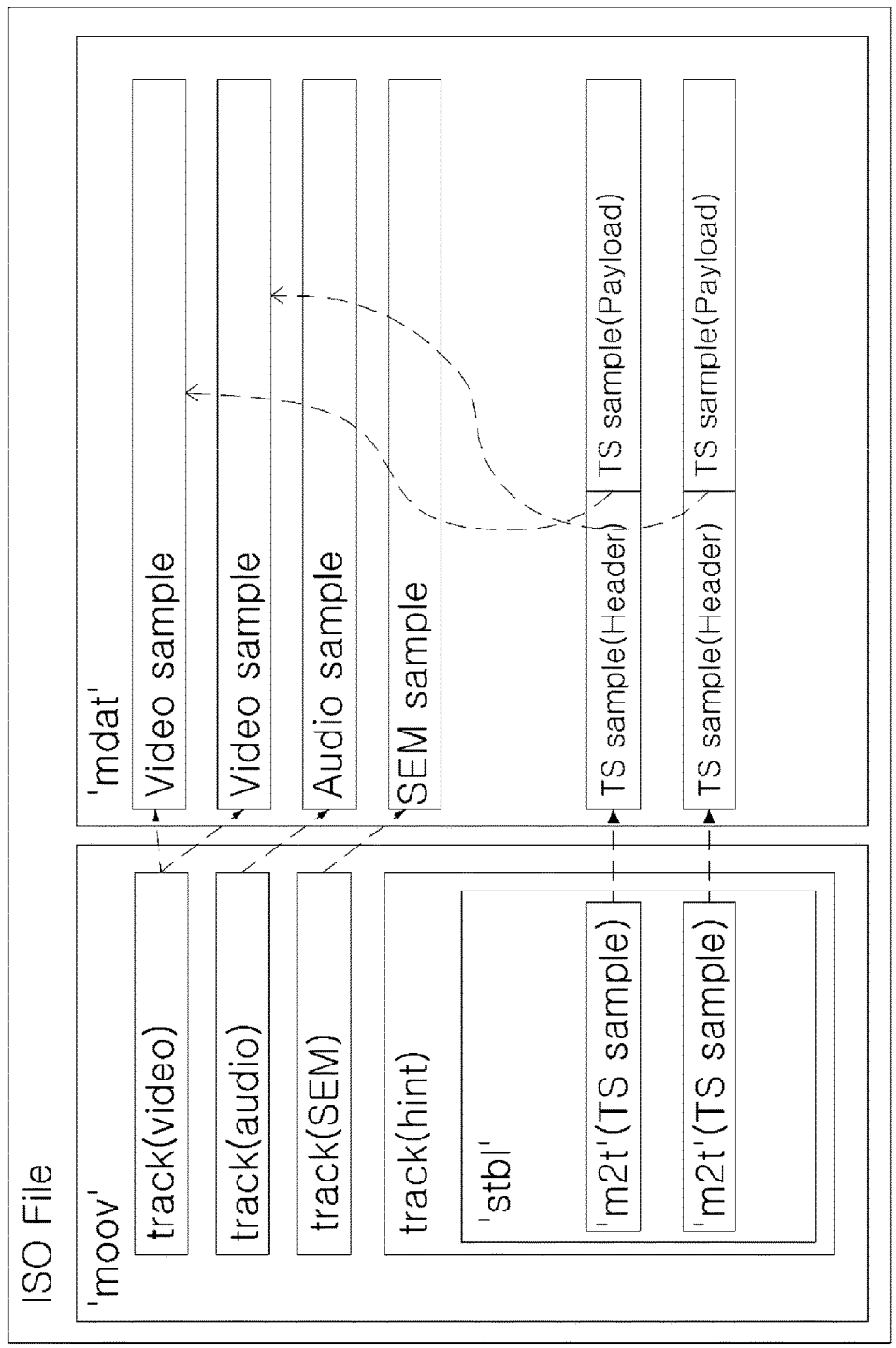
FIG. 8 is a diagram for describing a method of constructing the transmission stream sample of a sensory effect media data file related to an embodiment of the invention.

FIG. 8 is a diagram for describing a method of constructing the transmission stream sample of a sensory effect media data file related to an embodiment of the invention.

FIG. 8 shows a method of constructing a TS (transport stream) sample by using a Hint track. The hint sample of the mdat box represents one TS packet. A TS packet is composed of a header and a payload. The header includes information such as the sync byte for synchronization with a decoder, PID, which is the only value for differentiating packets, and the like. The information of the header includes information for transmissions which are unrelated to audio-visual contents. In contrast, the payload may be composed of audio, video, and other media. The Hint track may aid the construction of the information carried in the payload of the TS packet by referencing the video sample and audio sample. In this configuration, the offsets of the media samples (video samples, audio samples, and other media samples) are carried by the payloads of the TS samples. If the Hint tracks are not used, separate MAF files for playing and separate TS files for transmission may be required. By using Hint tracks, however, one file can fulfill the purposes of both playing and transmission, and since the payload of a TS sample carries only the offset of a sample, the storage capacity can be reduced. This is an important reason for creating a sensory effect media data file by using SEM tracks. If hint tracks are used in a sensory effect media data file that employs SEM tracks, one file can satisfy the purposes of playing and transmitting 4D Media (or sensory media), and this advantage can provide a foundation by which not only large-scale broadcasting companies but also individual users may utilize 4D broadcasts easily and conveniently.

Figure 9:
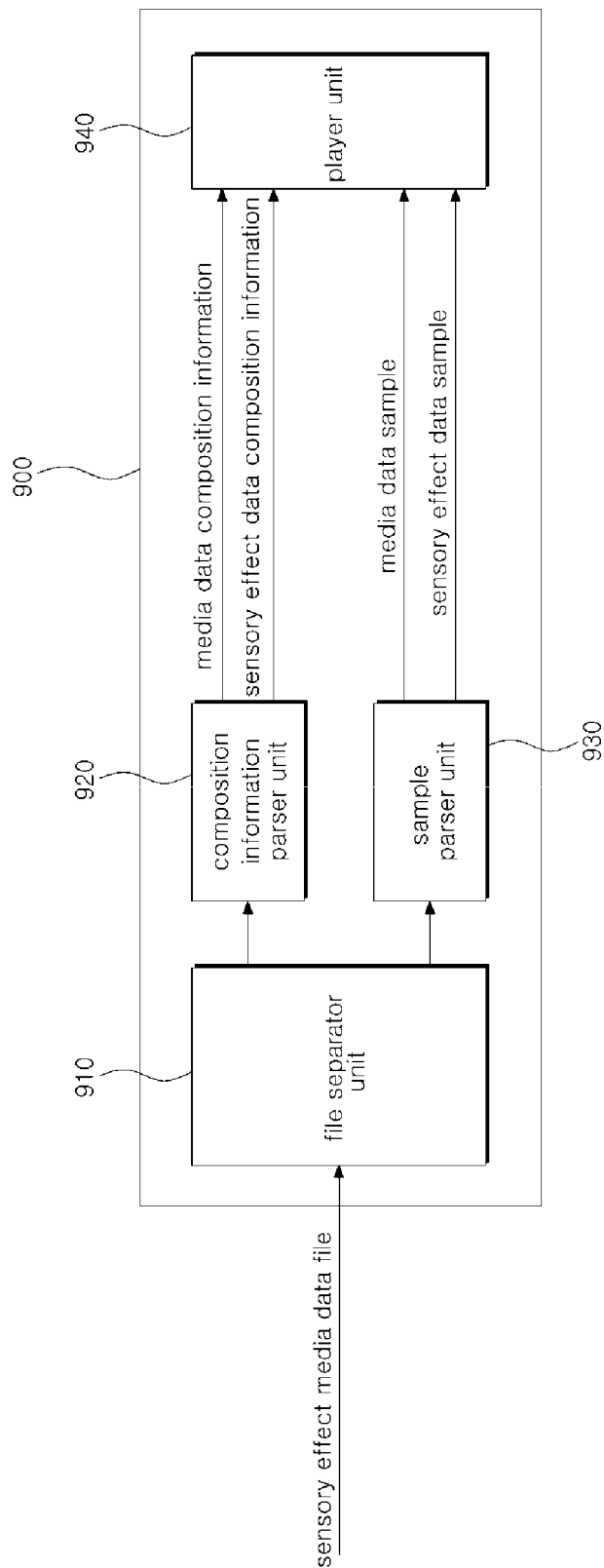
FIG. 9 is a block diagram of an apparatus for playing a sensory effect media data file related to an embodiment of the invention.

FIG. 9 is a block diagram of an apparatus for playing a sensory effect media data file related to an embodiment of the invention. With this embodiment, a method of for playing a sensory effect media data file by using a track box will be described.

As illustrated in the drawing, a sensory effect media data file player apparatus 900 can include a file separator unit 910, a composition information parser unit 920, a sample parser unit 930, and a player unit 940.

The file separator unit 910 can receive a sensory effect media data file as input from the outside, and can separate the composition information container field and the media data field included in the sensory effect media data file.

The information included in the composition information container field can be inputted to the composition information parser unit 920, and the information included in the media data field can be inputted to the sample parser unit 930.

The composition information parser unit 920 may parse the separated composition information container field to detect the first composition information, which represents the properties of the media data, and the second composition information, which represents the properties of the sensory effect data.

Also, the sample parser unit 930 can parse the separated media data field to detect samples of the media data and samples of the sensory effect data.

The composition information of the media data, the composition information of the sensory effect data, the media data samples, and the sensory effect data samples that are detected from the parsing by the composition information parser unit 920 and the parsing by the sample parser unit 930 can be inputted to the player unit 940.

The player unit 940 can combine the composition information of the media data, composition information of the sensory effect data, media data samples, and sensory effect data samples to play the sensory effect media data file.

According to an embodiment of the present invention, the sensory effect media data file player apparatus 900 can also play a sensory effect media data file constructed using meta boxes as in FIG. 2. In this case, the composition information of the media data, the media data samples, and the sensory effect data in the form of xml instances, as included in the sensory effect media data file can be separated, and the sensory effect media data file can be played by using the composition information of the media data, media data samples, and sensory effect data in the form of xml instances.

According to an embodiment of the present invention, sensory effect data and media data can be integrated into a single file for processing, so that the sensory effect media data can be stored, managed, and played effectively.

According to an embodiment of the present invention, sensory effect data can be divided into samples, and the samples of the sensory effect data and samples of media data can be inserted in the same field in constructing a sensory effect media data file, thereby allowing useful application to streaming services or broadcasting services.

The method of constructing a sensory effect media data file and the method of playing a sensory effect media data file described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software.

Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc.

Examples of a computer-readable medium can also include a transmitting medium such as light, metal lines, waveguides, etc., that transmits signals for specifying program instructions, data structures, etc.

Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

The method and apparatus for constructing a sensory effect media data file and the method and apparatus for playing a sensory effect media data file described above are not to be limited in their application to the compositions and methods of the embodiments described above. Rather, some or all of each of the embodiments may be selectively combined to form numerous variations.

DESCRIPTION OF NUMERALS

100: sensory effect media data file construction apparatus
110: composition information constructor unit
120: sample constructor unit
130: file constructor unit
900: sensory effect media data file player apparatus
910: file separator unit
920: composition information parser unit
930: sample parser unit
940: player unit

What is claimed is:

1. A method for constructing a sensory effect media data file, the method comprising:
   receiving a media object including media data;
   scanning the media object to extract information representing a property of the media data;
   constructing first composition information representing the extracted information representing a property of the media data;
   inserting the first composition information into a composition information container field;
   receiving a sensory effect object including sensory effect data;
   scanning the sensory effect object to extract information representing a property of the sensory effect data;
   constructing second composition information representing the extracted information representing a property of the sensory effect data;
   inserting second composition information into the composition information container field;
   extracting a sample of the media data from the media object;
   inserting the extracted sample of the media data into a media data field, the extracted sample representing data associated with a timestamp; and
   extracting a sample of the sensory effect data from the sensory effect object;
   inserting the extracted sample of the sensory effect data into the media data field;
   wherein the extracted sample of the sensory effect data inserted into the media data field comprises timed data from among the sensory effect data, the timed data being data affected by time, and untimed data from among the sensory effect data is included into the composition information container field.

2. The method of claim 1, wherein the timed data comprises group effect data for expressing at least two sensory effects, and
   the group effect data comprises samples of data for the at least two of sensory effects.

3. The method of claim 2, further comprising:
   constructing a group description index and sample count information;
   inserting the constructed group description index and sample count information into a group sample field, the constructed group description index representing identification information of a group, and the constructed sample count information representing a number of consecutive samples having an identical group description index.

4. An apparatus for constructing a sensory effect media data file, the apparatus comprising:
a composition information constructor unit configured to:
receive a media object including media data;
scan the media object to extract information representing a property of the media data;
constructing first composition information representing the extracted information representing a property of the media data;
receive a sensory effect object including sensory effect data;
scan the sensory effect data to extract information representing a property of the sensory effect data;
construct second composition information representing the extracted information representing a property of the sensory effect data;
extract a sample of the media data from the media object;
extract a sample of the sensory effect data from the sensory effect object;
insert the first composition information and second composition information into a composition information container field;
a sample constructor unit configured to insert the extracted sample of the media data into a media data field and insert the extracted sample of the sensory effect data into the media data field, the extracted sample of the media data representing data associated with a timestamp; and
a file constructor unit configured to construct a sensory effect media data file by combining the first composition information, the second composition information, the extracted sample of the media data, and the extracted sample of the sensory effect data;
wherein the extracted sample of the sensory effect data inserted into the media data field comprises timed data from among the sensory effect data, the timed data being data affected by time, and untimed data from among the sensory effect data is included into the composition information container field.

5. The apparatus of claim 4, wherein the timed data comprises group effect data for expressing at least two sensory effects, and
the group effect data comprises samples of data for the at least two sensory effects.

6. The apparatus of claim 5, wherein the composition information constructor unit constructs a group description index and sample count information and inserts the constructed group description index and sample count information into a group sample field, the constructed group description index representing identification information of a group, and the constructed sample count information representing a number of consecutive samples having an identical group description index.

7. A method for playing a sensory effect media data file, the method comprising:
scanning the sensory effect media data file;
extracting a composition information container field and a media data field from the sensory effect media data file;
scanning the extracted composition information container field to extract first composition information and second composition information from the extracted composition information container field, the extracted first composition information representing a property of media data, the extracted second composition information representing a property of sensory effect data;
scanning the extracted media data file to extract a sample of media data and a sample of sensory effect data, the extracted sample of media data representing data associated with a timestamp; and
playing the extracted sensory effect media data by using the extracted first composition information, the extracted second composition information, the extracted sample of the media data, and the extracted sample of the sensory effect data;
wherein the extracted sample of the sensory effect data comprising timed data from among the extracted sensory effect data, the timed data being data affected by time, and untimed data from the extracted sensory effect data.

8. The method of claim 7, wherein the timed data comprises group effect data for expressing at least two sensory effects, and
the group effect data comprises samples of data for the at least two of sensory effects.

9. The method of claim 8, wherein the sensory effect media data file further comprises a group sample field having a group description index and sample count information inserted therein, the group description index representing identification information of a group, the sample count information representing a number of consecutive samples having an identical group description index,
extracting the sample of sensory effect data further comprises extracting the group sample field included in the sensory effect media data file,
extracting the first and second composition information further comprises extracting the group description index and the sample count information by parsing the group sample field, and
the playing further comprises using the group description index and the sample count information.

10. An apparatus for playing a sensory effect media data file, the apparatus comprising:
a file separator unit configured to scan the sensory effect media data file to identify and extract a composition information container field and a media data field included in the sensory effect media data file;
a composition information parser unit configured to scan the extracted composition information container field to extract first composition information and second composition information, the extracted first composition information representing a property of media data, the extracted second composition information representing a property of sensory effect data;
a sample parser unit configured to scan the extracted media data field to extract a sample of the media data and a sample of the sensory effect data, the extracted sample of the media data representing data associated with a timestamp; and
a player unit configured to play the extracted sensory effect media data by using the extracted first composition information, the extracted second composition information, the extracted sample of the media data, and the extracted sample of the sensory effect data;
wherein the extracted sample of the sensory effect data comprises timed data from among the extracted sensory effect data, the timed data being data affected by time, and untimed data from among the extracted sensory effect data.

11. The apparatus of claim 10, wherein the timed data comprises group effect data for expressing at least two sensory effects, and
   the group effect data comprises samples of data for the at least two of sensory effects.

* * * * *